United States Patent
Li et al.

(10) Patent No.: US 10,033,850 B2
(45) Date of Patent: Jul. 24, 2018

(54) METHOD FOR REAL TIME DISPLAYING INFORMATION AND MOBILE COMMUNICATION TERMINAL

(71) Applicants: BEIJING QIHOO TECHNOLOGY COMPANY LIMITED, Beijing (CN); QIZHI SOFTWARE (BEIJING) COMPAMY LIMITED, Beijing (CN)

(72) Inventors: Tao Li, Beijing (CN); Tao Wang, Beijing (CN); Hongliang Wu, Beijing (CN); Sun Dali, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 60 days.

(21) Appl. No.: 14/761,578

(22) PCT Filed: Jan. 7, 2014

(86) PCT No.: PCT/CN2014/070268
§ 371 (c)(1),
(2) Date: Jul. 16, 2015

(87) PCT Pub. No.: WO2014/110991
PCT Pub. Date: Jul. 24, 2014

(65) Prior Publication Data
US 2015/0365514 A1    Dec. 17, 2015

(30) Foreign Application Priority Data

Jan. 17, 2013   (CN) .......................... 2013 1 0017854
Jan. 17, 2013   (CN) .......................... 2013 1 0017866
Jan. 17, 2013   (CN) .......................... 2013 1 0017895

(51) Int. Cl.
*H04M 1/725*      (2006.01)
*H04M 1/57*       (2006.01)
(Continued)

(52) U.S. Cl.
CPC .......... *H04M 1/72569* (2013.01); *G06F 3/14* (2013.01); *H04M 1/57* (2013.01); *H04M 3/42* (2013.01)

(58) Field of Classification Search
CPC ....................................................... G06Q 10/10
(Continued)

(56) References Cited

U.S. PATENT DOCUMENTS 6,961,420 B2 * 11/2005  DeSalvo ......... H04M 1/274516
                                                       379/142.01
7,283,813 B2 * 10/2007  Hamanaga ............. H04M 1/56
                                                       455/412.1
(Continued)

FOREIGN PATENT DOCUMENTS

CN           1812450 A       8/2006
CN         101232467 A       7/2008
(Continued)

OTHER PUBLICATIONS

International Patent Application No. PCT/CN2014/070268; Int'l Search Report; dated Apr. 16, 2014; 3 pages.

*Primary Examiner* — Vladimir Magloire
*Assistant Examiner* — Majid Syed
(74) *Attorney, Agent, or Firm* — Baker & Hostetler LLP

(57) ABSTRACT

The embodiment of the present invention discloses a method for real-time displaying information and a mobile communication terminal. The method includes: searching multiple kinds of attribute information of a current communication object in the mobile communication terminal upon communication of the mobile communication terminal; determining at least one kind of attribute information of the multiple kinds of attribute information changed in a server; acquiring the changed attribute information from the server, so as to update the multiple kinds of attribute information; and displaying the updated multiple kinds of attribute informa- (Continued)

tion on a communication interface of the mobile communication terminal according to a preset display format. The embodiment of the present invention may reduce the user's operations, make the display of the information more consistent and facilitate browsing information for a user.

28 Claims, 6 Drawing Sheets

(51) Int. Cl.
    *G06F 3/14* (2006.01)
    *H04M 3/42* (2006.01)

(58) Field of Classification Search
    USPC .......................................................... 709/206
    See application file for complete search history.

(56) References Cited

U.S. PATENT DOCUMENTS 7,877,083 B2    1/2011    Chen et al.

| | | | |
|---|---|---|---|
| 2003/0048195 A1* | 3/2003 | Trossen | G07C 9/00111 340/8.1 |
| 2009/0182821 A1* | 7/2009 | Allen | H04L 63/10 709/206 |
| 2009/0216725 A1* | 8/2009 | Yaqub | G06Q 10/107 |
| 2014/0063175 A1* | 3/2014 | Jafry | H04M 1/67 348/14.02 |

FOREIGN PATENT DOCUMENTS

| CN | 101304575 A | 11/2008 |
|---|---|---|
| CN | 101599974 A | 12/2009 |
| CN | 101635772 A | 1/2010 |
| CN | 102413169 A | 4/2012 |
| CN | 102663106 A | 9/2012 |
| CN | 102811202 A | 12/2012 |
| CN | 102857637 A | 1/2013 |
| CN | 103067559 A | 4/2013 |
| CN | 103078949 A | 5/2013 |
| CN | 103139761 A | 6/2013 |

* cited by examiner

METHOD FOR REAL TIME DISPLAYING INFORMATION AND MOBILE COMMUNICATION TERMINAL

This application is the National Stage of International Application No. PCT/CN2014/070268, filed on Jan. 7, 2014, which claims priority to Chinese Patent Application No. 201310017895.5, filed on Jan. 17, 2013, Chinese Patent Application No. 201310017854.6, filed on Jan. 17, 2013, and Chinese Patent Application No. 201310017866.9, filed on Jan. 17, 2013, the disclosures of which are incorporated herein by reference in their entireties.

TECHNICAL FIELD

The embodiments of the present invention relates to the field of communication, and in particular, to a method for real-time displaying information and a mobile communication terminal.

BACKGROUND

In recent years, a mobile communication terminal (such as a mobile phone) has been widely used, which brings a great convenience for a user's communication. Usually the mobile communication terminal has an address book. Taking the mobile phone as an example, the user may save information of multiple contacts in the mobile phone, and make calls or interact through short messages with these contacts through the mobile phone.

A traditional address book only saves the name and contact information of contacts. At present, some mobile phones may also support to save relevant information such as the portraits and cities of the contacts in the address book. In this case, when receiving a phone call from a contact or making a phone call to the contact, the information as discussed above can be extracted from the address book and displayed on the mobile phone interface together with the name or the phone number of the contact.

The problems in the prior art are as follows:
1. When receiving or making a phone call, locally saved and relevant information of a contact may be displayed on the interface of the mobile phone; if the relevant information of the contact is updated, the contact needs to notify the user actively, and then the user manually edits the address book to update contact information. In such a manner, the user cannot obtain the latest information of the contact in time and the updating operation on the information is relatively complicated.
2. For different mobile phone operating system or different mobile phone brands, there is great difference between the relevant information of the contact saved in the address book. For example, a mobile phone of brand A supports setting cities for the contact while a mobile phone of brand B does not support it; and when displaying the relevant information of the contact, display formats will also be different from each other. If a user has a number of different mobile phones, it is inconvenient for the user to browse information due to different displaying contents and displaying formats.

In addition, when an incoming or an outgoing call is displayed in the prior art, except information such as a phone number and a name corresponding to the phone number, provided by the system, some third-party software may also show additional relevant information such as the phone call attribution of the phone number, so that the user may acquire more information of the telephone number. However, when the third-party software in the prior art displays the additional relevant information, it typically generates a small window overlapping on the system interface and then shows the content of the additional information in the small window. However, this small window may partially hide the information showed in the system interface, causing that the user is not able to read basic information of the system while reading the additional information.

Moreover, the incoming or outgoing call in the prior art is generally displayed according to the contact information saved in a local address book. However, some target phone numbers corresponding to the incoming or outgoing calls may be business numbers, for example, a customer service phone of a courier company, a customer phone of a fast-food restaurant, and so on. For a business number, the user generally may not save the relevant information as a contact in the address book. Therefore, the relevant information of the business number cannot be displayed from information saved in the local address book to the user. In addition, even though some applications may show the relevant information of the business number according to their statistics, it is sometimes inaccurate.

SUMMARY OF THE INVENTION

In view of the above problems, the present invention is proposed to provide a method for real-time displaying information and a related mobile communication terminal which may be able to overcome or at least partially relieve the problems.

According to one aspect of the present invention, there is provided a method for real-time displaying information, including:
searching multiple kinds of attribute information of a current communication object in the mobile communication terminal upon communication of the mobile communication terminal;
determining at least one kind of attribute information of the multiple kinds of attribute information changed in a server;
acquiring the changed attribute information from the server, to update the multiple kinds of attribute information; and
displaying the updated multiple kinds of attribute information on a communication interface of the mobile communication terminal according to a preset display format.

According to another aspect of the present invention, there is provided a mobile communication terminal, including:
a search module, configured to search multiple kinds of attribute information of a current communication object in the mobile communication terminal upon the communication of the mobile communication terminal;
a change determining module, configured to determine at least one kind of attribute information of the multiple kinds of attribute information changed in a server;
an update module, configured to acquire the changed attribute information from the server, so as to update the multiple kinds of attribute information; and
a display module, configured to display the updated multiple kinds of attribute information on a communication interface of the mobile communication terminal according to a preset display format.

According to the embodiments of the present invention, when contact information is updated, there is no need for the contact to inform the user actively, the information will be exchanged to the server at the time of communication with the contacts. If it is determined that at least one kind of attribute information of the contact has been changed, it is possible to further acquire the latest attribute information from the server and display the updated attribute information on the communication interface, thereby reducing the user's operations.

According to the embodiments of the present invention, it is possible to further acquire attribute information absent from the mobile communication terminal but saved in the server, so that the mobile phone with different operating systems or different brands may acquire complete and consistent attribute information. Moreover, according to the embodiments of the present invention, the attribute information of the communication object is displayed in a preset format, so that display of information may be more consistent, thereby facilitating browsing information for a user.

According to the embodiments of the present invention, after the relevant information of a target phone number in an incoming or outgoing call event is acquired, the relevant information may be displayed in a display interface in a full-screen mode, and the display interface is up above a default interface provided by the system. Therefore, for the user, all the relevant information can be displayed in the same display interface without a phenomenon of covering part of the information. In addition, since the acquired relevant information in the embodiments of the present invention can include locally saved information and the information acquired from the server which can be provided and uploaded by the owner of the target phone number. Therefore, it is possible to display more abundant information in a more flexible form, so that the displayed relevant information of each target phone number may not be constrained in a fixed form but reflect a personality of the owner of each target phone number.

According to the embodiments of the present invention, after monitoring the incoming or outgoing call event and acquiring the target phone number, it is possible to acquire relevant information of the target phone number from a cloud server. Since the relevant information may be provided and uploaded by the owner of the phone number, in the case of a business user, the business user may update information that is needed to display to the user in time, and an authenticity of relevant information uploaded by the business user may be easily verified, etc. In addition, benefits of acquiring relevant information of the phone number from the server side are as follows: the target phone number of some incoming or outgoing call may not be recorded in a local address book, therefore if information is acquired only based on the information recorded in the local address book, relevant information can not be acquired. However, when acquiring the relevant information from the server side, as long as the user of the target phone number has ever uploaded his/her relevant information to the server, the relevant information may be acquired and displayed to the current user of the phone. In the case of an individual target phone number, it is not necessary for the user to set portrait or perform other operations for each of contacts in the address book, reducing the user's operations and saving local memory space of the mobile communication terminal. Also, it is possible to display more abundant information in a more flexible form, so that the displayed relevant information of each target phone number may not be constrained in a fixed form but reflect a personality of the owner of each target phone number.

The above description is merely an overview of the technical solution of the present invention. In order to more clearly understand the technical solution of the present invention to implement in accordance with the contents of the description, and to make foregoing and other objects, features and advantages of the present invention more apparent, detailed embodiments of the present invention will be provided below.

BRIEF DESCRIPTION OF THE DRAWINGS

Various further advantages and benefits will become apparent to those of ordinary skills in the art from the following detailed description of preferred embodiments. The accompanying figures are provided for the illustrative purpose of the preferred embodiments and are not intended to limit the present invention. Throughout the accompanying figures, the same components will be indicated by the same reference sign. In the accompanying figures.

DETAILED DESCRIPTION OF THE EMBODIMENTS

Exemplary embodiments of the present disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be thorough and complete, and will fully convey the scope of the present invention to those skilled in the art.

The embodiments of the present invention may be applied to a computer system/server and can be operated together with numerous other universal or dedicated computing system, environment or configuration. Examples of the well-known computing system, environment or configuration suitable for use with the computer system/server may include but not be limited to: a personal computer system, a server computer system, a thin client, a thick client, a hand-held or laptop equipment, a microprocessor-based system, a set-top box, a programmable consumer electronic product, a network personal computer, a minicomputer system, a large computer system and a distributed cloud computing technology environment including any of above systems, and so on.

The computer system/server may be described under a general context of a computer system executable instruction (such as, a program module) executed by the computer system. Usually, the program module may include a routine, a program, an objective program, a component, logic, data structure and so on, which are able to perform a specified task or achieve a specified abstract data type. The computer system/server may be implemented in the distributed cloud computing environment. In the distributed cloud computing environment, the task is performed by a remote processing device through a communication network link. In the distributed cloud computing environment, the program module may be located in a storage medium of a local or remote computing system including a memory device.

Figure 1:
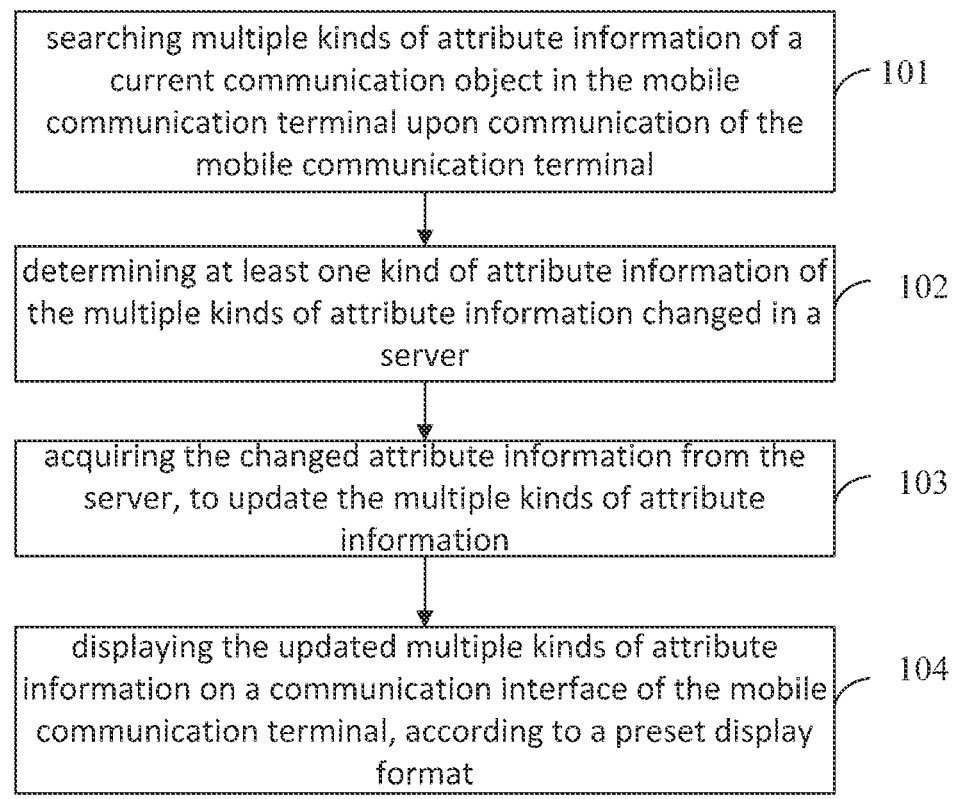
FIG. 1 is a flow chart showing a method for real-time displaying information according to an embodiment of the present invention.

FIG. 1 is a flow chart showing a method for real-time displaying information according to an embodiment of the present invention, the method particularly including:

Step 101, searching multiple kinds of attribute information of a current communication object in the mobile communication terminal upon communication of the mobile communication terminal.

In the embodiment of the present invention, the communication object which communicates with the mobile communication terminal may include a contact in the address book of the mobile communication terminal or a stranger that is absent from the address book. The communication between the mobile communication terminal and the communication object may particularly be that the mobile communication terminal receives a call request from the communication object (incoming call) or makes a call request to the communication object (outgoing call), or may be that it receives a short message from the communication object or sends a SMS to the communication object.

In the embodiment of the present invention, the mobile communication terminal may save multiple kinds of attribute information corresponding to a plurality of communication objects. In particular, the attribute information may be set for each communication object on the user's own initiative or saved after the communication with the communication object. The step 101 may particularly include:

Sub-step S11, acquiring an identity tag of the communication object;

Sub-step S12, searching the multiple kinds of attribute information of the communication object in the mobile communication terminal according to the identity tag.

The attribute information of the communication object uses its identity tag as a marker. Upon the acquirement of the identity tag of the communication object, corresponding attribute information may be further extracted according to the identity tag. In the embodiment of the present invention, attribute information may have varied types, and particularly include some information, such as names, mobile phone numbers, user signature, portraits, occupation, location information of the communication object or business promotion information. For example, in the case of an individual as the current communication object, multiple kinds of attribute information may include 15200000000 as the phone number, a personal photo as the portrait, Haidian district of Beijing as the location information and an engineer as professional information; for another example, in the case of a certain company (such as a restaurant) as the current communication object, multiple kinds of attribute information may include 1380000000 as the phone number, a photo of the restaurant as the portrait, Zhongguancun South Street as the location information and 20% discount off for January as the commercial promotion information.

In the embodiment of the present invention, the identity tag may be a mobile phone number of the mobile communication terminal or a MD 5 value of the mobile phone number. By performing a MD 5 algorithm on the mobile phone number currently used in the mobile communication terminal, corresponding identification information may be obtained. The MD 5 algorithm is the Message Digest Algorithm 5. The role of MD 5 is to allow the large capacity information to be "compressed" into a confidential format before signing a private key by the digital signature software, which is to transform a byte string with arbitrary length into a hexadecimal digit string with a certain length so as to ensure a consistency of information transmission.

Step 102, determining at least one kind of attribute information of the multiple kinds of attribute information changed in a server.

In the embodiment of the present invention, attribute information respectively corresponding to a plurality of communication objects may be pre-saved in the server. The attribute information may be set by the communication objects through their mobile communication terminals, and the attribute information in the server may be updated at any time.

After the attribute information of the current communication object saved in the mobile communication terminal is acquired, the acquired attribute information may be further compared with the attribute information saved in the server, so as to judge at least one of the multiple kinds of attribute information has been changed in the server, that is at least one kind of attribute information has been updated in the server.

Specifically, each kind of attribute information may carry a corresponding time tag respectively. The step 102 may include:

Sub-step S21, sending the identity tag of the communication object and the time tags carried by the multiple kinds of attribute information to the server; and Sub-step S22, receiving an update instruction returned by the server according to the identity tag and the time tag, and determining that the update instruction is for updating at least one kind of attribute information.

In the embodiment of the present invention, it may be determined whether a change has occurred according to the time tag carried by each kind of attribute information. In a specific implementation, the time tag is timestamp information. The timestamp refers to the time when information is created, modified or accessed. When one or more kinds of attribute information of the communication object are changed, the timestamp information will be updated to the latest time. According to different timestamp information, the attribute information between before and after the update may be distinguished.

In the judgment, the identity tag of the communication object and the time tag carried by each of the multiple kinds of attribute information are firstly sent to the server. In a specific implementation, since the communication object may be a stranger, the attribute information of the stranger may not exist in the mobile communication terminal. In this case, a preset character may be used as the time tag of user information. The preset character may be 0 or other characters.

After the time tag is sent to the server, the server may find the pre-saved multiple kinds of attribute information of the communication object according to the identity tag of the communication object. If the server has the pre-saved multiple kinds of attribute information, it may further compare the consistency of the time tags between the multiple kinds of attribute information saved in the mobile communication terminal and the multiple kinds of attribute information saved in the server, and may return a update instruction to the mobile communication terminal. Several specific cases are as follows:

1. Among the above multiple kinds of attribute information, if each kind of attribute information has consistent time tag in the mobile communication terminal and the server respectively, it may be indicated that the multiple kinds of attribute information in the mobile communication terminal are the latest attribute information, so that there is no need for a further update; or that no attribute information of the communication object has been found in the server. In each of situations, the update instruction will indicate not to update;

2. Among the above multiple attribute information, if at least one kind of the attribute information has inconsistent time tag in the mobile communication terminal and the server respectively, it may be indicated that inconsistent attribute information has occurred in the server, so that there is a need to further acquire the latest attribute information from the server. Therefore, the update instruction will indicate to update at least one of the multiple kinds of attribute information; and 3. If the time tag sent to the server is the preset character, that is the mobile communication terminal has no attribute information of the communication object, the update instruction will indicate to update at least one of the multiple kinds of attribute information.

In the embodiment of the present invention, for the first case, if the update instruction indicates not to update, the corresponding multiple kinds of attribute information can be directly extracted from the mobile communication terminal according to the identity tag or the mobile phone number of the communication object, and be displayed on the communication interface of the mobile communication terminal.

According to the embodiment of the present invention, when contact information is updated, there is no need for the contact to inform the user actively, but the information will be exchanged to the server at the time of communication with the contact. If it is judged that at least one kind of attribute information of the contact has been changed, it is possible to further acquire the latest attribute information from the server and display the updated attribute information on the communication interface, thereby reducing the user's operations.

In the embodiment of the present invention, the identity tag is used as a tag to search in the server for the multiple kinds of attribute information of the communication object. The identity tag could be a mobile phone number of the communication object or a MD 5 value of the mobile phone number. Therefore, the change of the attribute information may include the following two cases:

If the attribute information for the mobile phone number has been changed, a new mobile phone number and the old phone number may be preferably bonded. When the old phone number is called to communicate with the communication object, the corresponding attribute information may also be found in the server by using the old mobile phone number as the identity tag, and if a predefined access condition is met, the mobile communication terminal may further acquire the new mobile phone number of the contact object.

If the attribute information for the mobile phone number has not been changed, the old attribute information may be directly replaced by the new attribute information, and the corresponding time tag may be updated.

In the embodiment of the present invention, each of communication objects can save the multiple kinds of attribute information in the server through the following steps:

Sub-step S31, the mobile communication terminal receiving an attribute information submission request and verifying an input phone number;

Sub-step S32, with the approval of the verification, sending the identity tag to the server for saving, and receiving a user identity identifier generated by the server according to the identity tag;

Sub-step S33, sending the multiple kinds of attribute information and the user identity identifier of the mobile communication terminal to the server, and with approval of the verification of the user identity identifier by the server, saving the multiple kinds of attribute information.

Each communication object can save the identity information and the user information in the server by mean of the currently used mobile communication terminal. The communication object may first submit an attribute information submission request to the mobile communication terminal. In particular, the mobile communication terminal may be preset with an attribute information submission entry, through which the communication object may submit the request; then the mobile phone number currently used by the mobile communication terminal may be required to be input; after receiving the mobile phone number, the mobile communication terminal may verify the input mobile phone number, the purpose of which is to determine the mobile phone number input by the communication object is the currently used mobile phone number of the mobile communication terminal.

If the verification is passed, the identity tag corresponding to the mobile communication terminal may be further sent to the server for saving; after receiving the identity tag, the server may save the identity tag and generate a user identity identifier to return it to the mobile communication terminal. The user identity identifier is used to identify the identity of the mobile communication terminal and the server, and is used as verification ground sent from the mobile communication terminal to the server. The user identity identifier is generated according to the identity tag of the mobile communication terminal, and particularly includes the MD 5 value of the mobile phone number of the mobile communication terminal mobile and the address information of the server.

After receiving the user identity identifier returned by the server, the mobile communication terminal may further send the server corresponding multiple kinds of attribute information which carries the user identity identifier returned by the server at the same time; the server may compare the address information of the server included in the user identity identifier with the address information of the current server, and if the two pieces of information is consistent, it is determined that verification is passed.

With approval of the verification of user identity identifier, the multiple kinds of attribute information may be saved. During the saving process, with reference to an identity tag of the mobile communication terminal contained in the user identity identifier, the identity tag may be searched in the server, and the identity tag and the multiple kinds of attribute information may be mapped and saved.

In the embodiment of the present invention, Sub-step S31 may particularly include:

Sub-step 31-1, receiving the attribute information submission request, and generating a verification short message containing a random verification code; and Sub-step 31-2, sending the verification short message according to the input mobile phone number, and if the mobile communication terminal receives the verification short message containing the same random verification code, the verification being passed.

After receiving a request for submitting attribute information, the mobile communication terminal may generate a verification short message containing a random verification code and send the verification short message according to the input mobile phone number (i.e., send the verification short message to the input mobile phone number). If the input mobile phone number is the mobile phone number used by the current mobile communication terminal, the mobile communication terminal may receive the verification short message sent by itself.

Each of the short messages received by the mobile communication terminal may be intercepted, so as to determine whether the verification short message is the previously sent verification short message by comparing the random verification codes contained in the verification short messages. If the verification codes are consistent, it is indicated that the input mobile phone number is the mobile phone number of the current mobile communication terminal. If no verification short message or no general short message is intercepted within a period of time, the mobile communication terminal may prompt a failure or an expiration of the verification and the mobile phone number may be necessarily input for verification again.

In the embodiment of the present invention, the communication object may save the multiple kinds of attribute information in the server through the above steps, and may update one or more kinds of the attribute information stored in the server at any time.

The above step of saving the multiple kinds of attribute information in the server may particularly include step of starting a mobile phone number verification and step of uploading data. In order to better understand the present invention by those skilled in the art, two schematic diagrams will be described in detail below.

Figure 3:
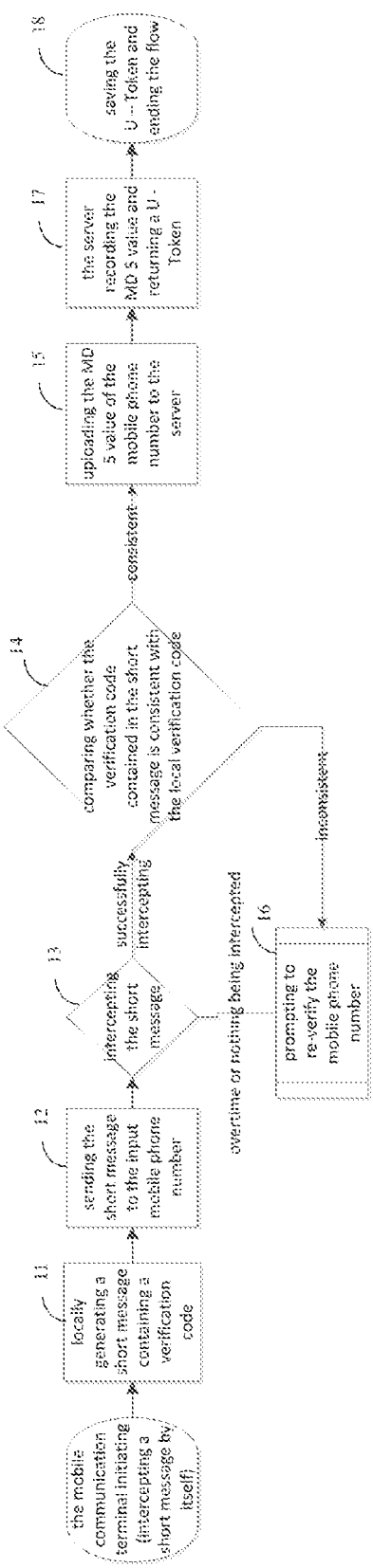
FIG. 3 is a schematic diagram showing steps of opening a mobile phone number verification according to an embodiment of the present invention.

FIG. 3 is a schematic diagram showing steps of opening a mobile phone number verification. The steps may particularly include:

Step 11, locally generating a short message containing a verification code;

Step 12, sending the short message to the input mobile phone number;

Step 13, intercepting the short message;

Step 14, comparing whether the verification code contained in the short message is consistent with the local verification code, and if consistent, executing step 15;

Step 15, uploading the MD 5 value of the mobile phone number to the server;

Step 16, prompting to re-verify the mobile phone number;

Step 17, the server recording the MD 5 value and returning a U-Token; and

Step 18, saving the U-Token.

When uploading the multiple kinds of attribute information to the server, the communication object first triggers a verification operation, and then inputs the mobile phone number required to be verified. The mobile communication terminal locally generates a short message containing a verification code and sends it to the input mobile phone number. The current mobile communication terminal intercepts the sent short message, and upon verifying that the verification code therein is consistent with the locally generated verification code, it passes the verification; if not consistent, it prompts to re-verify the mobile phone number.

After the verification, the MD 5 value of the mobile phone number of the current mobile communication terminal may be uploaded to the server. The server may save the MD 5 value, and may save the multiple kinds of attribute information correspondingly to the MD 5 value after receiving the multiple kinds of attribute information. The server may generate a U-Token (namely the user identity identifier), and return it to the mobile communication terminal. The mobile communication terminal may save the U-Token.

Figure 4:
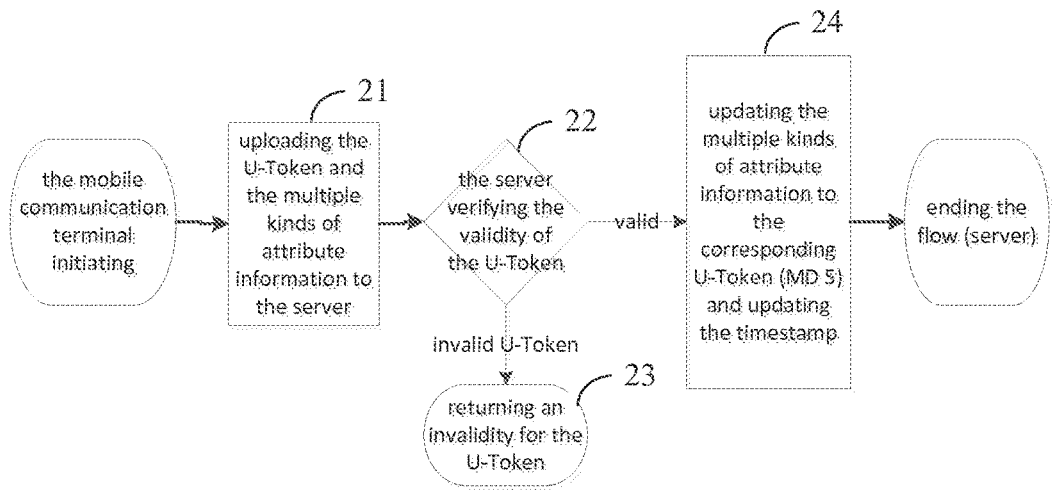
FIG. 4 is a schematic diagram showing steps of data according to an embodiment of the present invention.

FIG. 4 is a schematic diagram showing steps of the above uploading data. The steps may particularly include:

Step 21, uploading the U-Token and the multiple kinds of attribute information to the server;

Step 22, the server verifying the validity of the U-Token;

Step 23, returning an invalidity for the U-Token; and

Step 24, updating the multiple kinds of attribute information to the corresponding MD 5 value and updating the timestamp.

After the verification of the mobile phone number, the multiple kinds of attribute information may be further uploaded and saved in the server. At the same time, the U-Token which is sent to the mobile communication terminal after the verification of the mobile phone number may also be uploaded. After the server verifies a validity of the U-Token, that is, the server address in the user identity identifier is consistent with the current server address, the multiple kinds of attribute information may be saved to the MD 5 value of the mobile communication terminal.

Step 103, acquiring the changed attribute information from the server, to update the multiple kinds of attribute information.

After a need to update one or more kinds of attribute information is determined, the attribute information required to be updated may be further acquired from the server. In the embodiment of the present invention, the update instruction returned from the server to the mobile communication terminal may include the attribute information to be updated. The step 103 may include:

Sub-step S41, sending an update request carrying the identity tag of the communication object to the server according to the attribute information to be updated; and Sub-step S42, receiving the attribute information to be updated searched by the server according to the identity tag.

After receiving the update request submitted by the mobile communication terminal, the server may first find the multiple kinds of attribute information of the communication object according to the identity tag of the communication object carried by the update request, and then extract the attribute information required to be updated. In the embodiment of the present invention, since the update instruction has indicated the attribute information required to be updated, only the attribute information required to be updated can be further acquired. Compared with updating all the attribute information, the transmission quantity of data can be reduced.

Step 104, displaying the updated multiple kinds of attribute information on a communication interface of the mobile communication terminal, according to a preset display format.

In the embodiment of the present invention, each kind of attribute information may be shown and embodied in the form of text, audio, video, image, sound or animation. Due to different brands or operating systems of the mobile communication terminals, the content and the form for displaying will be different. When displaying the multiple kinds of attribute information, the embodiment of the present invention may organize the updated multiple kinds of attribute information into a display interface according to the preset display format, and the display interface covers a current communication interface. Even if the current user has a number of different mobile communication terminals, since the same display manner is used to display the information, more consistent information may be displayed and it may be convenient for the user to browse information.

Preferably, before the step of determining at least one kind of attribute information of the multiple kinds of attribute information changed in the server, the method may also include:
determining that the mobile communication terminal is currently in a state of connection to the network.

During communication with the communication object, it may be possible to further judge whether the mobile communication terminal is connected to a network. If it is connected to the network, it may be possible to further judge whether the attribute information has been changed in the server. If it is not connected to the network, the multiple kinds of attribute information of the current communication object may be directly extracted from the mobile communication terminal. In a specific implementation, it is possible to acquire the identity tag of the communication object and then judge the connection of the network, or to further acquire the identity tag of the communication object after determining the connection of the network.

When determining that at least one kind of attribute information of the multiple kinds of attribute information is changed in the server, the method may also include:
determining that the attribute information absent from the mobile communication terminal is saved in the server, and acquiring the absent attribute information from the server, and updating the absent attribute information into the multiple kinds of attribute information.

In the prior art, due to different operating systems or different mobile phone brands, the relevant information of a contact saved in the address book may vary a lot. In contrast, according to the embodiment of the present invention, the communication object may save multiple kinds of attribute information in the server and less kinds of attribute information may be saved in the mobile communication terminal. During communication with the communication object, it is possible to further acquire the attribute information absent from the mobile communication terminal but saved in the server, so that the mobile phones with different operating systems or different brands may acquire complete and consistent attribute information.

For example, the communication object saves the following information in the server:
name "A", phone number "13800000000", user signature "My style, My show", image of portrait "2560014913201237446", occupation "engineer" and location information "Beijing".

In contrast, the current mobile communication terminal is able to save only name, mobile phone number and portrait of the contact. The information particularly includes:
name "A", mobile phone number "15200000000" and portrait "albumview0816".

According to the embodiment of the present invention, it may be known that two kinds of attribute information have been changed in the server by comparing the time tags carried by the two kinds of attribute information, namely mobile phone number and portrait, so it is necessary to further acquire updated information from the server; meanwhile, it may be found by comparing that the user signature, occupation and location information belong to the attribute information which is absent from the mobile communication terminal of the communication object but saved in the server. Therefore, while acquiring the two kinds of attribute information, namely mobile phone number and portrait, it is possible to further acquire the absent user signature, occupation and location information from the server and update the multiple kinds of attribute information with them.

Preferably, the method may also include:
saving the multiple kinds of attribute information of the communication object; and/or, if the address book of the mobile communication terminal includes the mobile phone number of the communication object, updating the multiple kinds of attribute information of the contacts having the same mobile phone number in the address book according to the updated multiple kinds of attribute information of the communication object.

In the embodiment of the present invention, after acquiring the relatively complete multiple kinds of attribute information of current communication object, it is possible to save the information. On one hand, the identity tag or mobile phone number of the communication object and the multiple kinds of attribute information may be mapped and saved. On the other hand, if the communication object is present in the address book of the mobile communication terminal, the multiple kinds of attribute information of the contact having the same mobile phone number in the address book may be updated according to the acquired multiple kinds of attribute information As such, when the communication object is a stranger to whom next communication is made, corresponding multiple kinds of attribute information may be locally acquired directly to help the user judge where the phone call is from; when the communication object is a contact, even if limited kinds of attribute information are saved in the address book of the current mobile communication terminal, more comprehensive and complete attribute information may be acquired. After the address book is updated, it may be possible to realize an automatic update of the address book, reduce user's operations and release user's workload.

According to the embodiment of the present invention, when contact information is updated, there is no need for the contact to inform the user actively, but the information will be exchanged to the server at the time of communication with the contact. If it is judged that at least one kind of attribute information of the contact has been changed, it is possible to further acquire the latest attribute information from the server and display the updated attribute information on the communication interface, thereby reducing the user's operations.

According to the embodiment of the present invention, it is possible to further acquire the attribute information absent from the mobile communication terminal but saved in the server, such that the mobile phones with different operating systems or different brands may acquire complete and consistent attribute information. Moreover, according to the embodiment of the present invention, the attribute information of the communication object is displayed in a preset format, such that more consistent information may be displayed and it may be convenient for the user to browse information.

It should be noted that, for a brief description, aforementioned method embodiments are described as a combination of a series actions. However, those skilled in the art should appreciate that the present invention will not be limited by the sequence of actions as discussed. According to the present invention, some of steps may be performed in other sequence or performed at the same time. Also, those skilled in the art should know very well that the embodiments set forth in the description are preferred embodiments and the involved actions are not necessarily required in the present invention.

Figure 2:
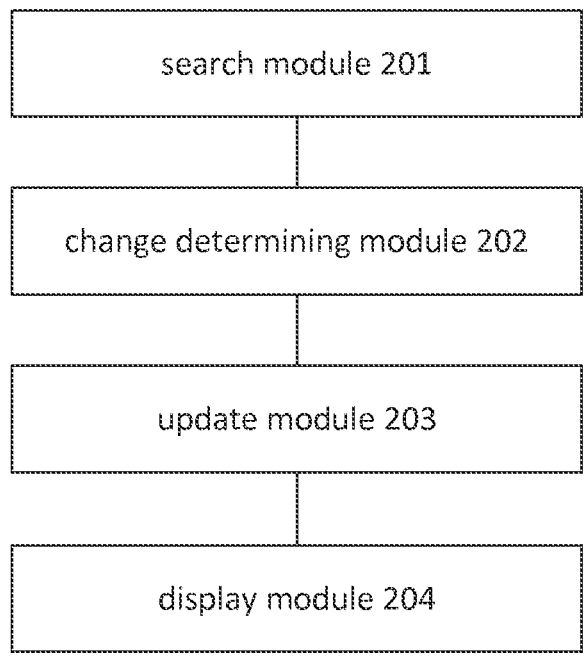
FIG. 2 is a block diagram showing a mobile communication terminal according to an embodiment of the present invention.

FIG. 2 is a block diagram showing a mobile communication terminal according to an embodiment of the present invention. The mobile communication terminal may particularly include:

a search module 201, configured to search multiple kinds of attribute information of a current communication object in the mobile communication terminal upon communication of the mobile communication terminal;

a change determining module 202, configured to determine at least one kind of attribute information of the multiple kinds of attribute information changed in a server;

an update module 203, configured to acquire the changed attribute information from the server, so as to update the multiple kinds of attribute information; and a display module 204, configured to display the updated multiple kinds of attribute information on a communication interface of the mobile communication terminal according to a preset display format.

In the embodiment of the present invention, the kinds of attribute information may include names, mobile phone numbers, user signature, portraits, occupation, location information of the communication object or business promotion information.

The attribute information may be in the form of text, audio, video, image, sound or animation.

Preferably, the mobile communication terminal may also include:

a network connection determining module, configured to determine that the mobile communication terminal is currently in a state of connection to a network.

Preferably, the change determining module may be also configured to:

determine that the attribute information absent from the mobile communication terminal is saved in the server, acquire the absent attribute information from the server, and update the absent attribute information into the multiple kinds of attribute information.

Preferably, the mobile communication terminal may save multiple kinds of attribute information corresponding to a plurality of communication objects respectively, and the search module may include:

an identity tag acquiring sub-module, configured to acquire an identity tag of the communication object; and an attribute information search sub-module, configured to search the multiple kinds of attribute information of the communication object in the mobile communication terminal according to the identity tag.

Preferably, each kind of attribute information may carry a corresponding time tag respectively, and the change determining module may include:

a tag sending sub-module, configured to send an identity tag of the communication object and the time tag carried by the multiple kinds of attribute information to the server; and an instruction receiving sub-module, configured to receive an update instruction returned by the server according to the identity tag and the time tag, and determine that the update instruction is for updating at least one kind of attribute information.

Preferably, the update instruction may include the attribute information to be updated, and the update module may include:

a request sending sub-module, configured to send an update request carrying the identity tag of the communication object to the server according to the attribute information to be updated; and an information receiving sub-module, configured to receive the attribute information to be updated searched by the server according to the identity tag.

Preferably, the display module may include:

a display interface generating module, configured to organize the updated multiple kinds of attribute information into a display interface according to the preset display format, and the display interface covers the current communication interface.

Preferably, the communication object can be a contact in an address book of the mobile communication terminal or a stranger that is absent from the address book.

Preferably, if there is no attribute information of the communication object in the mobile communication terminal, a preset character may be used as the time tag.

Preferably, when the time tag respectively corresponding to the multiple kinds of attribute information is consistent with the time tag of corresponding attribute information in the server, or when there is no attribute information of the communication object in the server, the update instruction may indicate not to update; and when the time tag of at least one kind of attribute information of the multiple kinds of attribute information is inconsistent with the time tag of the corresponding attribute information in the server, or when the time tag is a preset character, the update instruction may indicate to update said at least one kind of attribute information.

Preferably, the identity tag may be a mobile phone number of the communication object or a MD 5 value of the mobile phone number.

Preferably, the mobile communication terminal may also include:

a first saving module, configured to save the multiple kinds of attribute information of the communication object;

and/or, a second saving module, configured to, if the address book of the mobile communication terminal includes a mobile phone number of the communication object, update the multiple kinds of attribute information of contacts having the same mobile phone number in the address book according to the updated multiple kinds of attribute information of the communication object.

Since the embodiment of the mobile communication terminal is substantially similar to the method embodiment, the explanation thereof is relatively brief and reference could be made to the related parts in the method embodiment as shown in FIG. 1.

The various embodiments in the description are explained stepwise. Each of embodiments only emphasizes the differences from one another, and the same or similar explanations of various embodiments could be made reference to each other.

It should be appreciated by those skilled in the art that arbitrary combinations of the above embodiments are feasible, so that the arbitrary combinations between the above embodiments belong to the implementation manners of the present invention. Due to the limited space, detailed descriptions of these implementation manners will not be provided.

Figure 5:
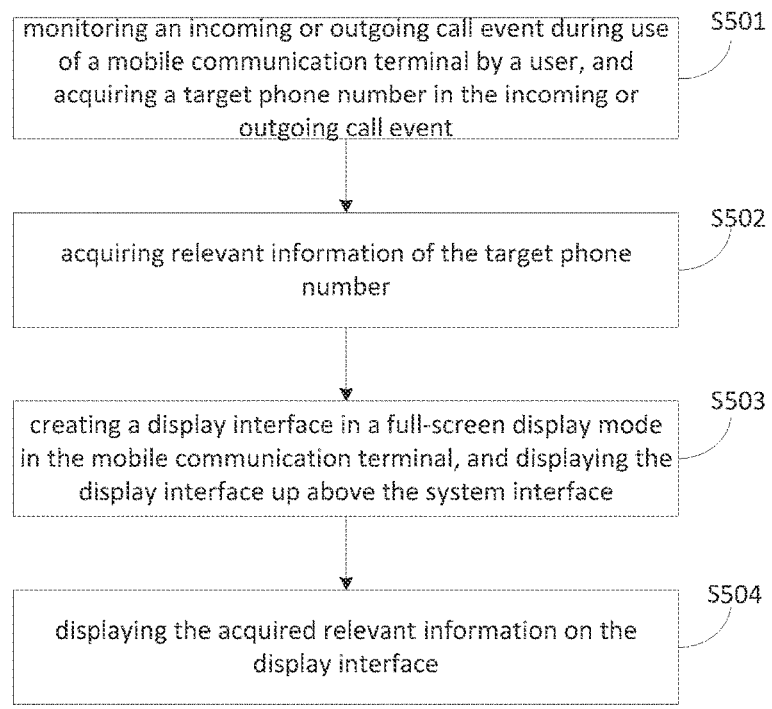
FIG. 5 is a flow chart showing a method for displaying relevant information of a phone number according to an embodiment of the present invention.

Referring to FIG. 5, a method for displaying relevant information of a phone number according to an embodiment of the present invention may include the following steps:

S501: monitoring an incoming or outgoing call event during use of a mobile communication terminal by a user, and acquiring a target phone number in the incoming or outgoing call event.

In the embodiment of the present invention, a main body for executing various steps could be an application operating on a mobile terminal device. That is, in practice, an application which is able to execute each step according to the embodiment of the present invention when it is in operation can be developed. Of course, the application can be an independent application or a function module in another application. For example, the incoming/outgoing call information display function of the present invention may be provided for security software.

Since the operating system in the mobile communication terminal device generally may open some interfaces for applications, the applications may obtain required information from the system. Therefore, in the embodiment of the present invention, in order to monitor the incoming/outgoing call event, this characteristic of the mobile communication terminal system can be used to register the application in the operating system. As such, when the operating system broadcasts notification messages, the application can receive these notification messages and obtain the required information therefrom. For example, when receiving an incoming call, the operating system of the mobile communication terminal will broadcast the incoming call message and carry the phone number of the incoming call. In this way, the application can monitor the event and obtain the phone number of the incoming call therefrom. Further, through the interface provided in the operating system of the mobile communication terminal, the application may read the data saved in an address book of the mobile communication terminal by the user. When the user as a calling party makes a phone call, the outgoing call event may be monitored in a similar manner, and information such as the phone number of a called party may be locally obtained. It should be explained that, in the embodiment of the present invention, the so-called target call number is the phone number of the calling party in the case of an incoming call, but it is the phone number of the called party in the case of an outgoing call. For example, assuming that the current user is a user A, when the user A receives a call from a user B, the phone number of the user B is the target phone number in this incoming call event; when the user A makes a call to a user C, the phone number of the user C is the target phone number in this outgoing call event.

S502: acquiring the relevant information of the target phone number.

The so-called relevant information is some reference information necessary for the user of the mobile communication terminal when a phone call is made or received. For example, the information may include a user name, a nickname, a portrait and the like corresponding to the phone number of an incoming or outgoing call. If the target phone number corresponding to the incoming or outgoing call is from a business number, such as KFC or an express company, the information may include a business name, a logo, etc.

In the embodiment of the present invention, the relevant information of the target phone number may be specifically acquired from many aspects. For example, in one aspect, the relevant information may be acquired from a local address book. That is, the present user may generally save contact information of some phone numbers in the address book, which most basically includes a title such as the name of the contact or relation with the owner and may further include the portrait, the nickname and the like of the contact. As a result, when the incoming or outgoing call is monitored, the relevant information of the target phone number may be acquired from the information saved in the local address book.

In addition, some software may also locally save some relevant information of the business phone number, such as the other name, logo and the like, from which relevant information of the current target phone number may be extracted.

Of course, in the first way, the acquired relevant information is set for each contact by the user, the available items are relatively fixed, and a process in which the user set the relevant information (such as, portrait) for each contact is complicated and it takes a long period of time; in the second way, the acquired relevant information is generally some business related information collected by a software developer on its own initiative, so that the accuracy can not be guaranteed on one hand and the locally saved information is unable to be updated in time on the other hand, and moreover the displayed information to the user is not necessarily the information that a business user really wants to display to the user.

Therefore, in practice, the application for displaying the relevant information of the incoming or outgoing call number may be realized by using a client-server architecture. The mobile communication terminal of the user may be installed with a client, and the client may communicate with the server to acquire some phone number related information from the server. As such, an individual user may upload and save his/her name, nickname, portrait or other relevant information to the server through his/her own client; thus, after monitoring an incoming or outgoing call event and acquiring a target phone number, it is possible to acquire relevant information of the target phone number from the server side.

That is to say, assuming that the address book of the current user A has a contact user B and so on, in the prior art, if the user A wants to show the portrait, organization and title of the user B in an incoming or outgoing call display, the user A may need to set and locally save the information of the user B on his/her own mobile communication terminal; in the embodiment of the present invention, however, the user B may upload his/her portrait, organization and title to the server side directly through the application client installed in his/her mobile communication terminal and save a correspondence between the phone number of the user B and the respective portrait, organization and title on the server side. As such, when the user A receives a call from the user B or the user A makes a call to the user B, the application may acquire relevant information of the user B from the server side to display to the user A. As a result, there is no need for the user A to locally set relevant information of the user B.

In addition, in the case of a business user, an online URL may be provided for the business user. The business user may upload and save the relevant information such as a phone number and its respective business name and logo to the server side. As such, when the user receives a call from the business user or makes a call to the business user, it is possible to acquire relevant information of the business user from the information saved in the server and display the relevant information to the current user. Moreover, in the case of a business user, saved information corresponding to its phone number may not be limited to a name, a logo or other information, but may further include some information of recent promotion. All the information may be displayed to a user who receives or is making the phone call, so that the user is able to acquire more abundant information and update the uploaded information in time so as to follow the latest promotion of the business user. Additionally, when the business user uploads relevant information of its phone number, the business user may also be requested to upload a business license or other relevant qualification documents, by which the authenticity of the uploaded information can be verified to avoid the user receiving wrong information.

Benefits of acquiring phone number related information from the server side are as follows: the target phone number of some incoming or outgoing calls may not be recorded in the local address book, such that if information is acquired only based on the information recorded in the local address book, relevant information can not be acquired. However, when acquiring from the server side, as long as the user of the target phone number has ever uploaded his/her relevant information to the server, the relevant information may be acquired and displayed to the current user of the phone. In addition, the relevant information of the target phone number recorded in the server side may include some malicious phone numbers reported by users. For example, some phone numbers are related to "ring once" harassment call, or real estate broker, insurance agent and the like. These kinds of information may all be recorded in the server. In this case, when the user receives such an incoming call, these kinds of information may be displayed to the current user, based on which the current user may selectively reject the call.

Of course, with respect to the relevant information of the phone number saved in the server side, the information saved in the local address book of the user may generally be more personalized or may reflect a relation with the user, such as father, mother, brother, sister or other relatives. Therefore, when practically acquiring the relevant information of the target phone number, it is possible to acquire locally and from the server at the same time and display all the acquired information to the user of the phone.

S503: creating a display interface in a full-screen display mode in the mobile communication terminal, and displaying the display interface up above the system interface.

After the relevant information of the target phone number is acquired from local and/or the server side, it is possible to display the information to the user of the phone. In the embodiment of the present invention, at the time of displaying the information to the user of the phone, in order to avoid a phenomenon such as an incomplete display of some information from the user's vision, the full-screen mode may be used to display the relevant information. That is, there is a need to create a display interface in the full-screen mode to display the display interface up above the system interface. In other words, another display interface covers on the system interface, and then display the acquired relevant information of the target phone number in the embodiment of the present invention on the display interface.

When the client application creates the display interface, the display interface corresponds to a window. In order to achieve foregoing purposes, some attributes of the window may be set. For example, the display mode attribute may be set as the full-screen mode and the level of the windows display may be set as a system error level or a system warning level. Since system in default arranges and displays the window with the system error level or system warning level on the topmost layer of all windows, it may be possible to guarantee that the display interface created in the embodiment of the present invention is placed over the system interface.

S504: displaying the acquired relevant information on the display interface.

After creating the full-screen mode and the display interface displayed up above the system interface, it is possible to display the acquired relevant information of the target phone number at step S502 on the display interface. In such a manner, as seen from the user, all the relevant information may be displayed in the same window without a phenomenon of covering part of the information. In addition, since the acquired relevant information in the embodiment of the present invention may include the locally saved information and the information acquired from the server, and the information acquired from the server may be uploaded by the owner of the target phone number, it is possible to display more abundant information in a more flexible form, such that the displayed relevant information of each target phone number may not be constrained in a fixed form but reflect a personality of the owner of each target phone number.

That is to say, in the embodiment of the present invention, the display interface of the application may be displayed over the display interface of the system. In practice, therefore, for the display of an incoming call, an operation access for answering or hanging up may be displayed on the display interface. In such a manner, when the user of the phone accesses through the operation access for answering or hanging up (click on a corresponding button, for example), it may be equivalent for the application to receive an operating instruction for answering or hanging up. Next, the application may invoke an interface of the system to perform a specific operation such as answering or hanging-up operation. In this way, original functions on the system interface can be guaranteed. Except the above operations, further extended operations such as recording, hands-free and hang-up message may be provided.

In a specific implementation, in order to enable the user to easily switch to the interface provided by the system, the display interface in the embodiment of the present invention may also provide a closing operation access. Upon the receipt of an operation request from the user through the operation access, the display interface may be directly closed, such that the default interface of the system may be naturally shown. The user may acquire the relevant information on the default interface of the system, and perform related operations such as the answer and hang-up.

In practice, as a matter of course, some mobile communication terminals may not support a display interface in the full-screen mode, or may not be provided with an access for answer and hang-up operations, such that it may be unable to perform the answer or hang-up operation in the display interface in the full-screen mode. In this case, the application may detect these phenomena and quit the application, so that the user may be able to see the interface of the system and perform the answer or hang-up operation in the system interface. That is to say, assuming the current mobile communication terminal can support to display a display interface in the full-screen mode but cannot support to answer or hang up a phone call in the display interface, from a view of the user, it is equivalent for the user to perform the answering or hanging-up operation in the display interface in the full-screen mode but see another interface which is the default display interface of the system. Then, only when the user performs the answering or hanging-up operation again in this interface, a response to the operation can be received successfully. In practice, in order to avoid an aversion of the user to these phenomena, these phenomena may also be recorded if detected. In this case, if the incoming or outgoing call event occurs again, it is not necessary to display according to the embodiment of the present invention but directly display the interface provided by the system to the user. In addition, if the current system does not support a display interface in the full-screen mode, the application may create another display interface, in which the answering or hanging-up operation access can be displayed, such that when a request for answering or hanging up from the user is received through the operation access, the application may invoke a system interface to perform an answering or hanging-up operation.

Herein, when judging whether the current mobile communication terminal supports the display interface in the full-screen mode or supports to receive or hang up a phone call in the interface in the full-screen mode, the judgement may be made according to a system message. For example, when creating an interface in the full-screen mode, if the system does not support it, the system typically may return a system message such as a creation failure to the application. Therefore, the system message may be used to judge whether the current mobile communication terminal supports the display interface in the full-screen mode created in the embodiment of the present invention. In addition, after the display interface in the full-screen mode in the embodiment of the present invention can be displayed, if the user accesses via the answering or hanging-up operation access, the application may invoke the interface of the system to perform corresponding operations; if the invoking is successful, the system may return a corresponding event tag, and if the invoking is not successful, the event tag may not be received. Therefore, depending on the receipt of the event tag, the application may judge whether it is possible to receive or hang up a call in the display interface in the full-screen mode.

Figure 6:
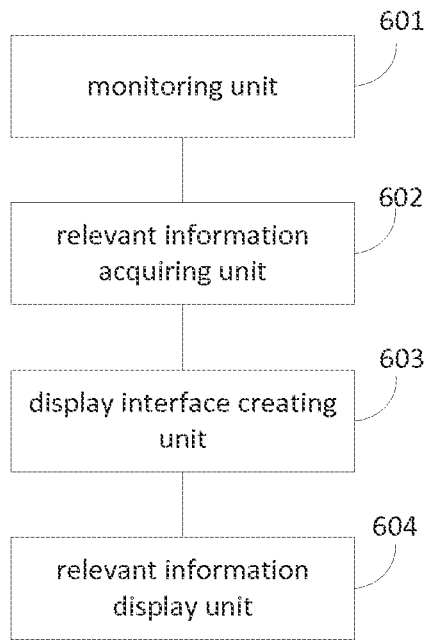
FIG. 6 is a schematic diagram showing a system for displaying relevant information of a phone number according to an embodiment of the present invention.

Corresponding to the method for displaying relevant information of a phone number according to the embodiment of the present invention, the embodiment of the present invention also provides a system for displaying the relevant information of the phone number. Referring to FIG. 6, the system may include:
a monitoring unit 601, configured to monitor an incoming or outgoing call event during use of the mobile communication terminal, and acquire a target phone number in an incoming or outgoing call event;
a relevant information acquiring unit 602, configured to acquire the relevant information of the target phone number;
a display interface creating unit 603, configured to create a display interface in a full-screen display mode in the mobile communication terminal, and display the display interface up above a system interface; and
a relevant information display unit 604, configured to display the acquired relevant information on the display interface.

Herein, the relevant information acquiring unit 602 may include:
a remote acquiring sub-unit, configured to acquire the relevant information of the target phone number from a cloud server, wherein the relevant information includes: information that is customized and uploaded to the cloud server to be saved by an owner of the target phone number, and/or relevant information of the target phone number that is collected by the cloud server according to information reported by a user.

Or, the relevant information acquiring unit 602 may include:
a local acquiring sub-unit, configured to acquire the relevant information of the target phone number from the local system of the mobile communication terminal.

In order to facilitate user's operations, the system may also include:
an operation access display unit, configured to display an answering or hanging-up operation access in the display interface; and
an invoking unit, configured to invoke an interface of the system to perform an answering or hanging-up operation when a request for answering or hanging up from the user is received through the operation access.

Some systems may not support the display interface in the full-screen mode, or may not provide an interface to be invoked, resulting in that it is unable to answer or hang up a phone call in the display interface of the present invention.

At this time, in order to ensure a normal use of the user, the system may also include:
a quitting unit, configured to, if the current system does not support the display interface in the full-screen mode or is unable to answer or hang up a call in the display interface in the full-screen mode, quit to display a default interface of the system.

Moreover, the system may also include:
a record unit, configured to, if the current system does not support the display interface in the full-screen mode or is unable to answer or hang up a call in the display interface in the full-screen mode, record to display a follow-up incoming or outgoing call in a default manner of the system.

The system may also include:
a creating unit, configured to, if the current system does not support the display interface in the full-screen mode, create another display interface, in which the answering or hanging-up operation access is displayed, such that when a request for answering or hanging up from the user is received through the operation access, invoke the interface of the system to perform the answering or hanging-up operation.

Moreover, the system may also include:
a closing operation access display unit, configured to display a closing operation access in the display interface; and
a display interface closing unit, configured to, when a closing request from the user is received through the operation access, close the display interface to display the default interface of the system.

The display interface creating unit may include:
an attribute setting sub-unit, configured to create the display interface in the mobile communication terminal, set a display attribute of the display interface as full-screen and set a display level of the display interface as a system error level or system warning level.

Figure 7:
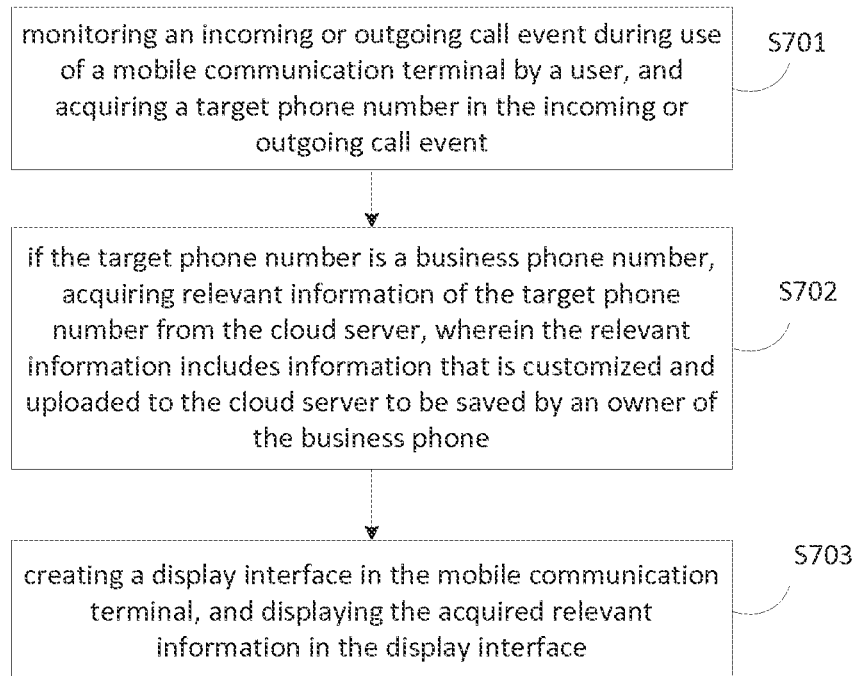
FIG. 7 is a flow chart showing a method for displaying phone number information according to an embodiment of the present invention.

Referring to FIG. 7, the method for displaying phone number information according to an embodiment of the present invention may include the following steps:
S701: monitoring an incoming or outgoing call event during use of a mobile communication terminal by a user, and acquiring a target phone number in the incoming or outgoing call event.

In the embodiment of the present invention, a main body for executing various steps could be an application operated on a mobile terminal device. That is, in practice, an application which is able to execute each step according to the embodiment of the present invention when it is in operation can be developed.

Of course, the application can be an independent application or a function module in another application. For example, the incoming/outgoing call information display function of the present invention may be provided for security software.

Since the operating system in the mobile communication terminal device generally may open some interfaces for applications, the applications may obtain required information from the system. Therefore, in the embodiment of the present invention, in order to monitor the incoming/outgoing call event, this characteristic of the mobile communication terminal system can be used to register the application in the operating system. As such, when the operating system broadcasts notification messages, the application can receive these notification messages and acquire the required information therefrom. For example, when receiving an incoming call, the operating system of the mobile communication terminal will broadcast the incoming call message and carry the phone number of the incoming call. In this way, the application can monitor the event and acquire the phone number of the incoming call therefrom. Further, through the interface provided in the operating system of the mobile communication terminal, the application may read the data saved in an address book of the mobile communication terminal by the user. When the user as a calling party makes a phone call, the outgoing call event may be monitored in a similar manner, and information such as the phone number of a called party may be locally obtained. It should be explained that, in the embodiment of the present invention, the so-called target call number is the phone number of a calling party in the case of an incoming call, but it is a phone number of a called party in the case of an outgoing call. For example, assuming that the current user is a user A, when the user A receives a call from a user B, the phone number of the user B is the target phone number in this incoming call event; when the user A makes a call to a user C, the phone number of the user C is the target phone number in this outgoing call event.

S702: if the target phone number is a business phone number, acquiring relevant information of the target phone number from the cloud server, wherein the relevant information includes information that is customized and uploaded to the cloud server to be saved by an owner of the business phone.

The so-called relevant information is some reference information necessary for the user of the mobile communication terminal when a phone call is made or received. For example, the information may include a user name, a nickname, a portrait and the like corresponding to the phone number of an incoming or outgoing call. If the target phone number corresponding to the incoming or outgoing call is from a business number, such as KFC or an express company, the information may include a business name, a logo, etc.

In the embodiment of the present invention, the application for displaying the relevant information of the incoming or outgoing call number may be realized by using a client-server architecture. The mobile communication terminal of the user may be installed with a client, and the client may communicate with the server to acquire some phone number related information from the server. As such, an individual user may upload and save his/her name, nickname, portrait or other relevant information to the server through his/her own client; thus, after monitoring an incoming or outgoing call event and acquiring a target phone number, it is possible to acquire relevant information of the target phone number from the server side.

That is to say, assuming that the address book of current user A has a contact user B and so on, in the prior art, if the user A wants to show the portrait, organization and title of the user B in an incoming or outgoing call display, the user A may need to set and locally save the information of the user B on his/her own mobile communication terminal; in the embodiment of the present invention, however, the user B may upload his/her portrait, organization and title to the server side directly through the application client installed in his/her mobile communication terminal and save a correspondence between the phone number of the user B and the respective portrait, organization and title on the server side. As such, when the user A receives a call from the user B or the user A makes a call to the user B, the application may acquire relevant information of the user B from the server side to display to the user A. As a result, there is no need for the user A to locally set relevant information of the user B.

Of course, on the server side, an authenticity of relevant information uploaded by the user may be verified, so as to avoid the user arbitrarily uploading relevant information that is not directed to his/her phone number. In a specific verification, when receiving a request for uploading relevant information for the current phone number by the current user, it is possible to judge whether the current user is the owner of the current phone number. If it is judged that the current user is the owner of the current phone number, the verification is passed, thereby testifying that the current user has an authority to upload relevant information for the current phone number. Then the relevant information input by the user may be uploaded to the cloud server to save.

A plurality of means can be employed to realize the specific judgement of whether the current user is the owner of the current phone number. One of possible means is as follows: first of all, when receiving a request for uploading relevant information, the application determining the phone number to which the current operation is directed (for example, inquiring for which phone number the user needs to input relevant information and inviting the user to input the phone number), and then generating a verification code to be locally saved; next, generating a short message containing the verification code, and sending the short message to the phone number input by the user through the mobile communication network; if the phone number input by the user is the number of the phone, this piece of the short message being receivable; then the application intercepting the piece of the short message and extracting the verification code therein to compare with a locally saved verification code; if the same, then testifying that the user just needs to input relevant information for the local phone number, that is to say, the owner of the phone number is performing the operation of uploading relevant information; therefore, it is allowed for the operation to upload the current phone number input by the user and its relevant information to the server and save a correspondence between the phone number and the relevant information in the server.

In addition, for an individual user, besides uploading the relevant information of his/her portrait and nickname for the phone number, the user may be also allowed to perform a report operation of relevant information for a phone number of other users. The report of the relevant information for a phone number of other user is generally directed to some phone numbers for malicious operations. For example, some phone numbers are related to "ring once" harassment call. Once the user calls back, he/she may be subjected to economic losses. Further, owners of some phone numbers may be real estate broker, insurance agent and so on, which may be rejected by some users. Therefore, the user may be allowed to perform a report operation against this type of phone number. Accordingly, the relevant pieces of information acquired by the user's report may be recorded in the server side. In this way, when the user receives such a call, the information may be presented to the current user, based on which the current user may choose whether to answer the call.

Of course, for the report type relevant information uploaded by users, in order to improve the accuracy of the information, collection and statistics of the information may be performed in the server side, and according to statistical result, respective tags may be marked on some of phone numbers. For example, after report information of a phone number from a user is received, the phone number is temporarily saved in the server side (at this point, the record information will not be presented to a user who receives the phone number); meanwhile, a counter is set for the phone number and increased by 1; when the report information of the phone number is received again, the counter is increased by 1 and specific content of report information is acquired (for what category of number the phone number is reported); when the counter of the phone number reaches a threshold value, a category to which the phone number specifically belongs is determined based on the specific content of report information, and a correspondence between the phone number and the specific category will be permanently saved; at this time, when a user receives an incoming call of the phone number, or when the user dials the phone number, the information saved in the server side may be displayed to the user.

That is to say, there are two cases for an individual user to upload relevant information for a phone number, one of which is to upload his/her own portrait, nickname, and other relevant information directing to his/her own phone number, and the other one of which is to upload report type relevant information for a phone number of other users. In practice, therefore, a client interface of application may be provided with two upload accesses for an individual user. When the user visits via an access for uploading relevant information of his/her own phone number, the user may be requested to input the phone number to verify whether the user has an upload authority (using the aforementioned verification code); and if the user visits via the other access for reporting other phone numbers, it is not necessary to perform aforementioned verification to the user's upload authority. For the latter, of course, in order to prevent a phone number being set up by some users deliberately, in addition to a precaution by the foregoing way of making a statistics in the server side, some control operations may also be performed in the client side. For example, only if a user has answered or dialed a phone number, the current user is allowed to upload report type relevant information for the phone number. That is to say, it is understood that only after the current user has made a communication with the other party, the current user may know the identity of the other party, or otherwise the current user could not make a judgement. As a result, when the user visits via an access for reporting the other phone number, it is possible to query local call records. If there is a received call or a dialed call for the current phone number, the user is allowed to upload report information for the phone number.

Above introduced is a case of uploading the relevant information of a phone number to the cloud server by an individual user. In practice, a business user may also be allowed to upload relevant information of its phone number. This kind of phone number is generally a customer service phone of the business user, such as 10086 or 400 telephone of the business user. When a user receives calls with these phone numbers, it is possible to display company information corresponding to the phone number and a logo of the company to the user. In the embodiment of the present invention, in the case of a business user, an online URL may be provided for the business user. The business user may upload and save the relevant information such as the phone number and its respective business name and logo to the server side. As such, when the user receives a call from the business user or makes a call to the business user, it is possible to acquire relevant information of the business user from the information saved in the server and display to the current user.

Moreover, in the case of a business user, saved information corresponding to its phone number may not be limited to a name, a logo or other information, but may also include some information about recent promotion. All the information may be displayed to a user who receives or is making the phone call, so that the user is able to acquire more abundant information and update the uploaded information in time so as to follow the latest promotion of the business user. Additionally, when the business user uploads relevant information of its phone number, the business user may also be requested to upload a business license or other relevant qualification documents, by which the authenticity of the uploaded information can be verified to avoid the user receiving wrong information.

Anyway, in the embodiment of the present invention, after monitoring the incoming or outgoing call event of the current user and acquiring the target phone number, it is possible to acquire relevant information of the target phone number from the cloud server. The relevant information may be uploaded by the owner of the phone number, including individual phone number and business phone number. In addition, the relevant information may include information statistically calculated by the cloud server according to the report information statistics collected by the client.

Of course, with respect to the relevant information of the phone number saved in the server side, the information saved in the local address book of the user generally may be more personalized or may reflect a relation with the user, such as father, mother, brother, sister or other relatives. Therefore, when practically acquiring the relevant information of the target phone number, it is possible to acquire locally and from the server at the same time and display all the acquired information to the user of the phone.

In addition, the cloud server may provide a list of phone numbers, relevant information of which has been uploaded. The client may download the list from the cloud server. In this way, after a target phone number in an incoming or outgoing call event is found, it is possible to first locally query to judge whether the relevant information of the target phone number has been uploaded to the cloud server. If yes, it is possible to acquire the relevant information from the cloud server, and otherwise, it is not necessary to send an acquiring request to the cloud server. Of course, the client can visit the cloud server regularly, so as to update the locally saved phone number list, or the cloud server can also actively push to the client after the phone number list is updated.

S703: creating a display interface in the mobile communication terminal, and displaying the acquired relevant information in the display interface.

After the relevant information of the target phone number is acquired, it is possible to create a display interface in the mobile communication terminal and display the acquired relevant information in the display interface. Herein, at the time of displaying the information to the user of the phone, in order to avoid a phenomenon such as an incomplete display of some information from a vision of the user, a full-screen mode may be used to display the relevant information. That is to say, it is possible to create a display interface in full-screen mode to display the display interface up above the system interface. In other words, another display interface covers on the system interface, and then display the acquired relevant information of the target phone number in the embodiment of the present invention on the display interface. That is to say, when a user receives or dials a phone call, the display interface as seen by the user is no longer the default interface provided by the system, but a display interface in the full-screen mode provided by the application. The displayed information may be some relevant information of the target phone number acquired by the application. The information may be locally acquired, or from the cloud server.

Herein, when the application of the client creates the display interface, the display interface corresponds to a window. In order to achieve foregoing purposes, some attributes of the window may be set. For example, the display mode attribute may be set as a full-screen mode and the level of the windows display may be set as a system error level or system warning level. Since a system in default arranges and displays the window with the system error level or system warning level on the topmost layer of all windows, it may be possible to guarantee that the display interface created in the embodiment of the present invention is placed over the system interface.

Anyway, in the embodiment of the present invention, after monitoring the incoming or outgoing call event of the current user and acquiring the target phone number, it is possible to acquire relevant information of the target phone number from the cloud server. Since the relevant information may be provided and uploaded by the owner of the phone number, it is not necessary for the user to set portrait or perform other operations for each of contacts in the address book, reducing the user's operations and saving local memory space of the mobile communication terminal. Also, it is possible to display more abundant information in a more flexible form, such that the displayed relevant information of each target phone number may not be constrained in a fixed form but reflect a personality of the owner of each target phone number. In the case of a business user, the business user may update information that is needed to display to the user in time as necessary, and an authenticity of the relevant information uploaded by the business user may be easily verified.

In addition, benefits of acquiring relevant information of the phone number from the server side are as follows: the target phone number of some incoming or outgoing call may not be recorded in the local address book, such that if information is acquired only based on the information recorded in the local address book, relevant information can not be acquired. However, when acquiring from the server side, as long as the user of the target phone number has ever uploaded his/her relevant information to the server, the relevant information may be acquired and displayed to current user of the phone.

In practice, while the relevant information of the target phone number is acquired from the cloud server, the information may be downloaded and saved in the local. In such a manner, if it is found that the user receives an incoming call with the phone number or dials the phone number again, it is possible to display to the user based on the locally saved relevant information. Of course, regardless of an individual phone number or business phone number, the relevant information uploaded to the server may be updated. Especially in the case of a business phone, its update frequency may be higher. Therefore, it is also possible to visit the cloud server regularly to acquire the latest relevant information of the target phone number and then to update the locally saved relevant information. Of course, in practice, in order to avoid an excessive utilization of local memory space, relevant information for only part of the target numbers can be downloaded. For example, only when a target phone number appears in the address book of the current user, and/or when the current user answers or dials a target phone number very frequently, its relevant information may be downloaded from the server to be locally saved.

Figure 8:
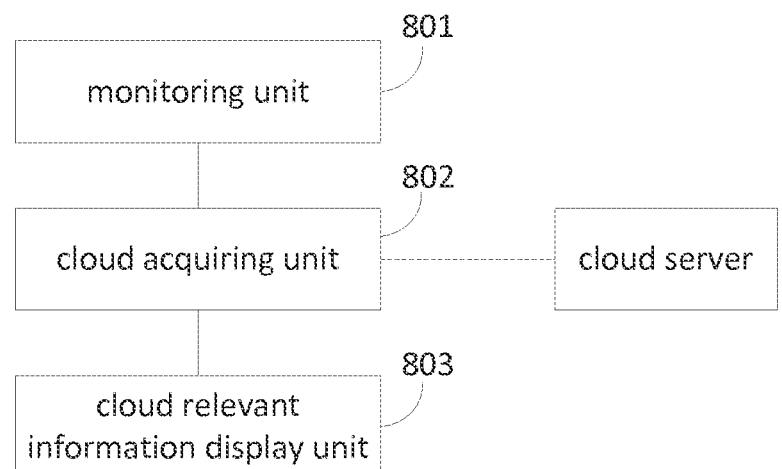
FIG. 8 is a schematic diagram showing a system for displaying phone number information according to an embodiment of the present invention.

Corresponding to the method for displaying phone number information according to the embodiment of the present invention, the present invention also provides a system for displaying phone number information. Referring to FIG. 8, the system may include:

a monitoring unit 801, configured to monitor an incoming or outgoing call event during use of the mobile communication terminal, and acquire a target phone number in the incoming or outgoing call event when the incoming or outgoing call event is monitored;

a cloud acquiring unit 802, configured to, if the target phone number is a business phone number, acquire the relevant information of the target phone number from a cloud server, wherein the relevant information includes information that is customized and uploaded to the cloud server to be saved by an owner of the business phone; and a cloud relevant information display unit 803, configured to create a display interface in the mobile communication terminal, and display the acquired relevant information in the display interface.

Herein, the relevant information may also include relevant information of the target phone number that is collected by the cloud server according to information reported by users.

In practice, the system may also include:
a local acquiring unit, configured to acquire the relevant information of the target phone number from a local system of the mobile communication terminal; and
a local relevant information display unit, configured to display the relevant information acquired from the local system in the display interface.

In addition, the system may also include:
a downloading unit, configured to download and locally save the relevant information of the target phone number from the cloud server, such that when the incoming or outgoing call event about the target phone number is monitored again, acquire the relevant information of the target phone number based on the locally saved information.

In order to update the downloaded information in time, the system may also include:
a visiting unit, configured to visit the cloud server regularly to acquire the latest relevant information of the target phone number; and
an updating unit, configured to update locally saved relevant information based on the latest relevant information.

The system may also include:
an individual number information acquiring unit, configured to, if the target phone number is an individual phone number, acquire the relevant information of the target phone number from the cloud server, wherein the relevant information includes information that is customized and uploaded to the cloud server to be saved by an owner of the individual phone.

If the owner of the target phone number is an individual, in order to improve the authenticity of the uploaded relevant information, the system may also include:
a first judging unit, configured to, when receiving a request for updating relevant information for a specified phone number from the current user, judge whether the current user is the owner of the specified phone number; and
an upload unit, configured to, if the current user is the owner of the specified phone number, pass the verification and upload the relevant information to the cloud server to be saved.

In a specific judgment of the upload authority of the user, the first judging unit may include:
a verification code generating sub-unit, configured to generate a verification code to be locally saved;
a short message generating sub-unit, configured to generate a short message containing the verification code, and send the short message to the specified phone number through a mobile communication network;
a short message intercepting sub-unit, configured to locally intercept the received short message;
a verification code extracting sub-unit, configured to extract the verification code from the intercepted short message; and
a verification code comparing sub-unit, configured to compare the extracted verification code with the locally saved verification code, and if the same, determine that the current user is the owner of the specified phone number.

In practice, for an individual user, besides uploading relevant information of his/her phone number, the user may also upload report type information against other phone numbers. The system may also include:
an upload access providing unit, configured to provide a first operation access for uploading relevant information for his/her own phone number, and a second operation access for reporting a phone number of other users;
the first judging unit being specifically configured to:
when receiving a request for uploading the relevant information for the specified phone number by the current user through the first operation access, judge whether the current user is the owner of the specified phone number.

In addition, the system may also include:
a second judging unit, configured to, when receiving a request for uploading the relevant information for the specified phone number by the current user through the second operation access, judge whether the current user has communicated with the owner of the specified phone number based on call records in the current mobile communication terminal, and if yes, upload reported information of the specified phone number input by the current user to the cloud server.

The system may also include:
a third judging unit, configured to judge whether the relevant information of the target phone number is saved in the cloud server, based on a pre-saved business phone list of uploaded relevant information; and
a trigger unit, configured to, if the judgement result of the third judging unit is yes, trigger an operation of acquiring relevant information of target phone number from the cloud server.

After monitoring an incoming or outgoing call event and acquiring the target phone number, the system for displaying phone number information according to the present invention is possible to acquire the relevant information of the target phone number from the cloud server. Since the relevant information may be provided and uploaded by the owner of the phone number, it is not necessary for the user to set portrait or perform other operations for each contact in the address book, reducing the user's operations and saving local memory space of the mobile communication terminal. Also, it is possible to display more abundant information in a more flexible form, such that the displayed relevant information of each target phone number may not be constrained in a fixed form but reflect a personality of the owner of each target phone number. In the case of a business user, the business user may update information that is needed to display to the user in time as necessary, and an authenticity of relevant information uploaded by the business user may be easily verified. In addition, benefits of acquiring relevant information of the phone number from the server side are as follows: target phone number of some incoming or outgoing call may not be recorded in the local address book, such that if information is acquired only based on the information recorded in the local address book, relevant information can not be acquired. However, when acquiring from the server side, as long as the user of target phone number has ever uploaded his/her relevant information to the server, the relevant information may be acquired and displayed to current user of the phone.

Algorithm and display provided herein is not inherently related to a particular computer, virtual system or other equipment. Various general systems may also be used with the teaching based on the present invention. According to the above description, the required structure for such a system is obvious. In addition, the present invention is not directed to any particular programming language. It should be understood that a variety of programming languages can be used to implement the disclosed invention as described herein and above description to the particular programming language is to disclose the best implementation mode of the present invention.

Many details are discussed in the description provided herein. However, it should be understood that the embodiments of the present invention can be implemented without these specific details. In some examples, the well-known method, structure and technology are not shown in detail, so as to avoid an unclear understanding of the description.

Similarly, it should be understood that, in order to simplify the disclosure and to facilitate the understanding of one or more of various aspects of the present invention, in the above description of the exemplary embodiments of the present invention, various features of the present invention may sometimes be grouped together into a single embodiment, accompanying figure or description thereof. However, the method of this disclosure should not be constructed to as an intention that the present invention for which the protection is sought claims more features in comparison with the features explicitly disclosed in each of claims. More specifically, as reflected in the following claims, the aspect of the present invention is in that the features in claims are less than all features of a single embodiment as disclosed above. Therefore, claims following specific embodiments are definitely incorporated into the specific embodiments, wherein each of claims can be considered as a separate embodiment of the present invention.

It should be understood by those skilled in the art that modules in the devices of the present invention can be adaptively modified and arranged in one or more devices different from the embodiments. Modules, units or components in the embodiments can be combined into one module, one unit or one component, and also can be divided into more sub-modules, sub-units or sub-components. Except that at least some of features and/or processes or units are mutually exclusive, various combinations can be used to combine all the features disclosed in the description (including claims, abstract and accompanying figures) and all the processes or units of any disclosed method or device. Unless otherwise definitely stated, each of features disclosed in the description (including claims, abstract and accompanying figures) may be replaced with alternative feature providing same, equivalent or similar purpose.

In addition, it should be understood by those skilled in the art, although some embodiments as discussed herein comprise some features included in other embodiment rather than other feature, combination of the features in different embodiments means that different embodiment is formed within a scope of the present invention. For example, in the following claims, any one of the embodiments for which the protection is sought can be used in any combination manner.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of the device for real-time displaying information according to the embodiments of the present invention. The present invention may further be implemented as equipment programs or device programs (for example, computer programs and computer program products) for executing some or all of the methods as described herein. The programs for implementing the present invention may be stored in computer readable medium, or have a form of one or more signal. Such a signal may be downloaded from the internet websites, or be provided in carrier, or be provided in other manners.

Figure 9:
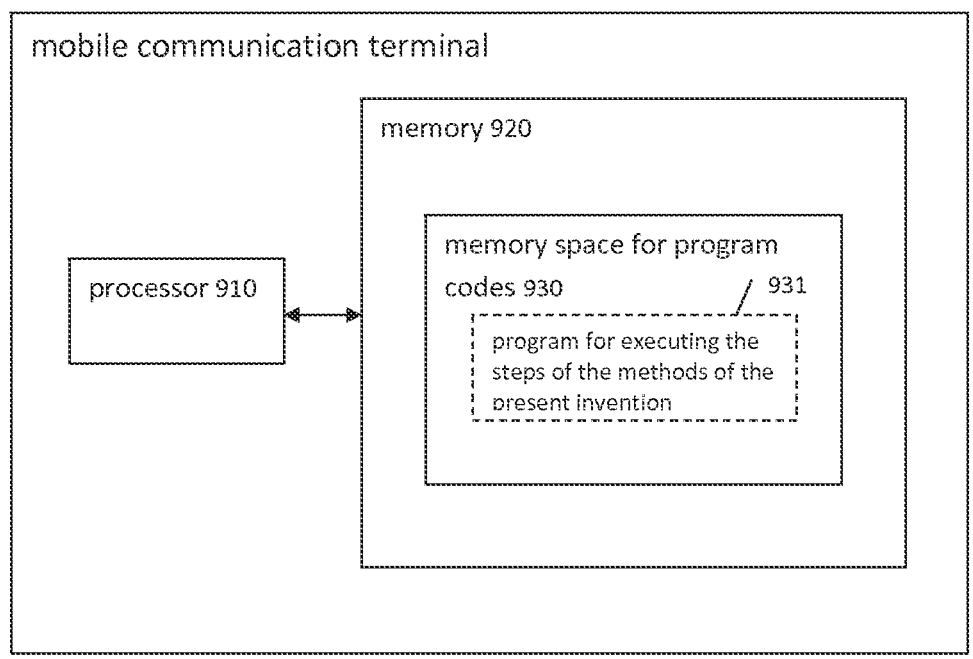
FIG. 9 is a block diagram of an intelligent electronic device for executing the method according to the present invention.
Figure 10:
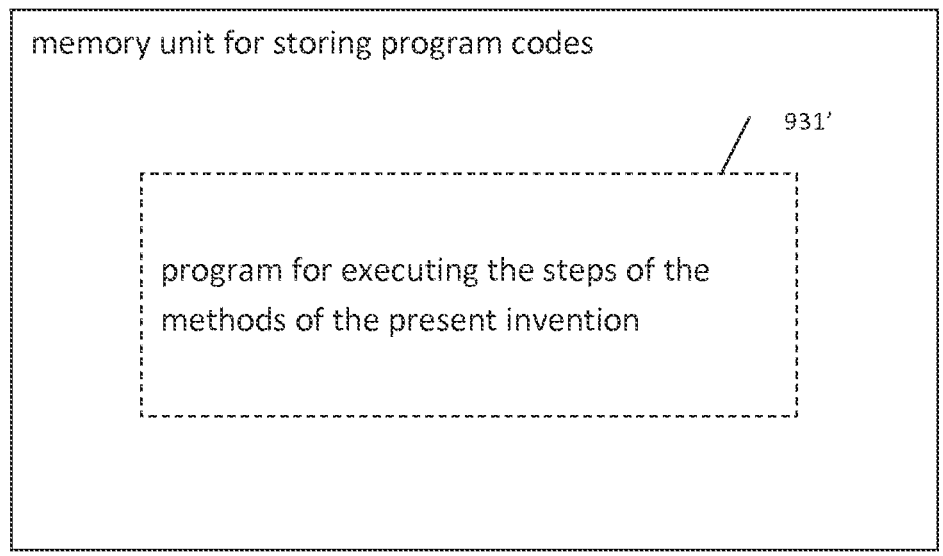
FIG. 10 is a schematic diagram of a memory unit for saving or carrying the program codes for executing the method according to the present invention.

For example, FIG. 9 shows a mobile communication terminal for implementing the method for real-time displaying information, displaying relevant information of a phone number and/or displaying phone number information according to the present invention. Traditionally, the mobile communication terminal comprises a processor 910 and a computer program product or a computer readable medium in the form of a memory 920. The memory 920 may be electronic memories such as flash memory, EEPROM (Electrically Erasable Programmable Read-Only Memory), EPROM, hard disk or ROM. The memory 920 has a memory space 930 for storing program codes 931 which are used to execute random steps in the above methods. For example, the memory space 930 for the program codes may comprise respective program codes 931 for implementing the various steps in the above mentioned methods. These program codes may be read from and/or be written into one or more computer program products. These computer program products comprise program code carriers such as hard disk, compact disk (CD), memory card or floppy disk. These computer program products are usually the portable or stable memory cells as shown in reference FIG. 10. The memory cells may be provided with memory sections, memory spaces, etc., similar to the memory 920 of the mobile communication terminal as shown in FIG. 9. The program codes may be compressed in an appropriate form. Usually, the memory cell includes programs 931' which are used to execute the steps of the methods of the present invention, i.e., the programs 931' are codes which can be read by processors such as 910. When these codes are operated on the mobile communication terminal, the mobile communication terminal may execute each step as described in the above methods.

It should be noticed that the above-described embodiments are intended to illustrate but not to limit the present invention, and alternative embodiments can be devised by the person skilled in the art without departing from the scope of claims as appended. In the claims, any reference symbols between brackets form no limit of the claims. The wording "comprising/including" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

The invention claimed is:

1. A method for real-time displaying information, including:

in response to an occurrence of a communication between a mobile communication terminal and a communication object, searching multiple kinds of attribute information of the communication object in the mobile communication terminal, wherein each kind of attribute information carries a corresponding time tag respectively, and the communication object exchanges information with the mobile communication terminal by the communication;

determining at least one kind of attribute information among the multiple kinds of attribute information of the communication object is changed in a server based at least in part on information exchanged to the server at the occurrence of the communication between the mobile communication terminal and the communication object, wherein the determining at least one kind of attribute information among the multiple kinds of attribute information changed in a server further comprises:
  sending an identity tag of the communication object and a time tag carried by the at least one kind of attribute information to the server,
  receiving an update instruction returned by the server according to the identity tag and the time tag, and
  determining that the update instruction is for updating the at least one kind of attribute information, wherein the update instruction includes attribute information to be updated;

acquiring changed attribute information from the server, and updating the changed attribute information of the communication object in the mobile communication terminal, wherein the acquiring changed attribute information from the server further comprises:
  sending an update request carrying the identity tag of the communication object to the server according to the attribute information to be updated, and
  receiving the changed attribute information searched by the server according to the identity tag; and displaying an update of the multiple kinds of attribute information of the communication object on a communication interface of the mobile communication terminal according to a preset display format.

2. The method according to claim 1, wherein the multiple kinds of attribute information respectively corresponding to a plurality of communication objects are saved in the mobile communication terminal, and the searching multiple kinds of attribute information of the communication object in the mobile communication terminal includes:

acquiring an identity tag of the communication object; and searching the multiple kinds of attribute information of the communication object in the mobile communication terminal according to the identity tag.

3. The method according to claim 1, wherein the displaying an update of the multiple kinds of attribute information on a communication interface of the mobile communication terminal according to a present display format includes:
organizing the multiple kinds of attribute information into a display interface according to the preset display format, and the display interface covers the current communication interface.

4. The method according to claim 1, wherein when the time tag respectively corresponding to the multiple kinds of attribute information is consistent with the time tag of corresponding attribute information in the server, or when there is no attribute information of the communication object in the server, the update instruction indicates not to update; and
when the time tag of at least one kind of attribute information of the multiple kinds of attribute information is inconsistent with the time tag of the corresponding attribute information in the server, or when the time tag is the preset character, the update instruction indicates to update said at least one kind of attribute information.

5. The method according to claim 1, wherein the method further includes:
saving the multiple kinds of attribute information of the communication object; and/or if the address book of the mobile communication terminal includes a mobile phone number of the communication object, then according to the updated multiple kinds of attribute information of the communication object, updating the multiple kinds of attribute information of contacts having the same mobile phone number in the address book.

6. The method according to claim 1, wherein the method further includes displaying relevant information of a phone number, which includes:
monitoring an incoming or outgoing call event during use of the mobile communication terminal, and acquiring a target phone number in the incoming or outgoing call event;
acquiring relevant information of the target phone number;
creating a display interface in a full-screen display mode in the mobile communication terminal, and displaying the display interface up above a system interface; and
displaying the acquired relevant information on the display interface.

7. The method according to claim 6, wherein the step of acquiring relevant information of the target phone number includes:
acquiring the relevant information of the target phone number from a cloud server, the relevant information including information that is customized and uploaded to the cloud server to be saved by an owner of the target phone number, and/or relevant information of the target phone number that is collected by the cloud server according to information reported by a user.

8. The method according to claim 6, wherein the method further includes:
displaying an answering or hanging-up operation access in the display interface; and
invoking an interface of the system to perform an answering or hanging-up operation when a request for answering or hanging up from the user is received through the operation access.

9. The method according to claim 8, wherein the method further includes:
if the current system does not support the display interface in the full-screen mode or is unable to answer or hang up a call in the display interface in the full-screen mode, quitting to display a default interface of the system; or
recording to display follow-up incoming or outgoing call in a default manner of the system.

10. The method according to claim 8, wherein the method further includes:
if the current system does not support the display interface in the full-screen mode, creating another display interface, in which the answering or hanging-up operation access is displayed, such that when a request for answering or hanging up from the user is received through the operation access, invoking the interface of the system to perform the answering or hanging-up operation.

11. The method according to claim 6, wherein the method further includes:
displaying a closing operation access in the display interface; and
when a closing request from the user is received through the operation access, closing the display interface to display a default interface of the system.

12. The method according to claim 1, wherein the method further includes displaying phone number information, which includes:
monitoring an incoming or outgoing call event during use of the mobile communication terminal by, and acquiring a target phone number in the incoming or outgoing call event;
if the target phone number is a business phone number, acquiring relevant information of the target phone number from a cloud server, the relevant information including information that is customized and uploaded to the cloud server to be saved by an owner of the business phone;
creating a display interface in the mobile communication terminal, and displaying the acquired relevant information in the display interface.

13. The method according to claim 12, wherein the method further includes:
if the target phone number is an individual phone number, acquiring the relevant information of the target phone number from the cloud server, the relevant information including information that is customized and uploaded to the cloud server to be saved by an owner of the individual phone;
when receiving a request for updating relevant information for a specified phone number from a current user, judging whether the current user is the owner of the specified phone number; and
if the current user is the owner of the specified phone number, passing a verification and uploading the relevant information to the cloud server to be saved.

14. The method according to claim 13, wherein the method further includes:
providing a first operation access for uploading relevant information for his/her own phone number, and a second operation access for reporting information for a phone number of other users;

the step of when receiving a request for updating relevant information for a specified phone number from the current user, judging whether the current user is the owner of the specified phone number, includes:
- when receiving a request for uploading the relevant information for the specified phone number by the current user through the first operation access, judging whether the current user is the owner of the specified phone number;
- when receiving a request for uploading the relevant information for the specified phone number by the current user through the second operation access, judging whether the current user has communicated with the owner of the specified phone number based on call records in the current mobile communication terminal, and if yes, uploading reported information for the specified phone number input by the current user to the cloud server.

15. The method according to claim 12, wherein the method further includes:
- judging whether the relevant information of the target phone number is saved in the cloud server, based on a pre-saved business telephone list of uploaded relevant information; and
- if yes, triggering an operation of acquiring the relevant information of the target phone number from the cloud server.

16. A mobile communication terminal, including:
- a processor; and
- a memory communicatively coupled to the processor and storing instructions that upon execution by the processor cause the terminal to:
- search multiple kinds of attribute information of a communication object in the mobile communication terminal in response to an occurrence of a communication between the mobile communication terminal and the communication object, wherein each kind of attribute information carries a corresponding time tag respectively, and the communication object exchanges information with the mobile communication terminal by the communication;
- determine at least one kind of attribute information of the multiple kinds of attribute information of the communication object is changed in a server based at least in part on information exchanged to the server at the occurrence of the communication between the mobile communication terminal and the communication object, wherein the instructions that upon execution by the processor cause the terminal to determine at least one kind of attribute information among the multiple kinds of attribute information changed in a server further cause the terminal to:
  - send an identity tag of the communication object and a time tag carried by the at least one kind of attribute information to the server,
  - receive an update instruction returned by the server according to the identity tag and the time tag, and
  - determine that the update instruction is for updating the at least one kind of attribute information, wherein the update instruction includes attribute information to be updated;
- acquire changed attribute information from the server, and updating the attribute information of the communication object in the mobile communication terminal, wherein the instructions that upon execution by the processor cause the terminal to acquire changed attribute information from the server further cause the terminal to:
  - send an update request carrying the identity tag of the communication object to the server according to the attribute information to be updated, and
  - receive the changed attribute information searched by the server according to the identity tag; and
- display an update of the multiple kinds of attribute information of the communication object on a communication interface of the mobile communication terminal according to a preset display format.

17. The mobile communication terminal according to claim 16, wherein multiple kinds of attribute information respectively corresponding to a plurality of communication objects are saved in the mobile communication terminal, and the memory further storing instructions that upon execution by the processor cause the terminal to:
- acquire an identity tag of the communication object; and
- search the multiple kinds of attribute information of the communication object in the mobile communication terminal according to the identity tag.

18. The mobile communication terminal according to claim 16, wherein the memory further storing instructions that upon execution by the processor cause the terminal to:
- organize the updated multiple kinds of attribute information into a display interface according to the preset display format, and the display interface covers the current communication interface.

19. The mobile communication terminal according to claim 16, wherein if there is no attribute information of the communication object in the mobile communication terminal, a preset character is used as the time tag;
- when the time tag respectively corresponding to the multiple kinds of attribute information is consistent with the time tag of corresponding attribute information in the server, or when there is no attribute information of the communication object in the server, the update instruction indicates not to update; and
- when the time tag of at least one kind of attribute information of the multiple kinds of attribute information is inconsistent with the time tag of the corresponding attribute information in the server, or when the time tag is the preset character, the update instruction indicates to update said at least one kind of attribute information.

20. The mobile communication terminal according to claim 19, wherein the memory further storing instructions that upon execution by the processor cause the terminal to:
- save the multiple kinds of attribute information of the communication object;
- if the address book of the mobile communication terminal includes a mobile phone number of the communication object, then according to the updated multiple kinds of attribute information of the communication object, update the multiple kinds of attribute information of contacts having the same mobile phone number in the address book.

21. The mobile communication terminal according to claim 16, wherein the mobile communication terminal further includes a system for displaying relevant information of a phone number, and the system is configured to:
- monitor an incoming or outgoing call event during use of the mobile communication terminal, and acquire a target phone number in the incoming or outgoing call event;
- acquire relevant information of the target phone number;

create a display interface in a full-screen display mode in the mobile communication terminal, and display the display interface up above a system interface; and display the acquired relevant information on the display interface.

22. The mobile communication terminal according to claim 21, wherein the system is further configured to:

acquire the relevant information of the target phone number from a cloud server, the relevant information including: information that is customized and uploaded to the cloud server to be saved by an owner of the target phone number, and/or relevant information of the target phone number that is collected by the cloud server according to information reported by a user; and acquire the relevant information of the target phone number from a local system of the mobile communication terminal.

23. The mobile communication terminal according to claim 21, wherein the memory further storing instructions that upon execution by the processor cause the mobile communication terminal further to:

display an answering or hanging-up operation access in the display interface; and invoke an interface of the system to perform an answering or hanging-up operation when a request for answering or hanging up from the user is received through the operation access.

24. The mobile communication terminal according to claim 23, wherein the memory further storing instructions that upon execution by the processor cause the mobile communication terminal further to:

if the current system does not support the display interface in the full-screen mode or is unable to answer or hang up a call in the display interface in the full-screen mode, quit to display a default interface of the system.

25. The mobile communication terminal according to claim 23, wherein the memory further storing instructions that upon execution by the processor cause the mobile communication terminal further to:

if the current system does not support the display interface in the full-screen mode or is unable to answer or hang up a call in the display interface in the full-screen mode, record to display follow-up incoming or outgoing call in a default manner of the system.

26. The mobile communication terminal according to claim 23, wherein the memory further storing instructions that upon execution by the processor cause the mobile communication terminal further to:

if the current system does not support the display interface in the full-screen mode, create another display interface, in which the answering or hanging-up operation access is displayed, so that when a request for answering or hanging up from the user is received through the operation access, invoke the interface of the system to perform the answering or hanging-up operation.

27. The mobile communication terminal according to claim 21, wherein the memory further storing instructions that upon execution by the processor cause the mobile communication terminal further to:

display a closing operation access in the display interface; and when a closing request from the user is received through the operation access, close the display interface to display the default interface of the system.

28. A non-transitory computer readable medium storing instructions that, when executed by at least one processor, cause the at least one processor to perform operations for real-time displaying information, comprising:

in response to an occurrence of a communication between a mobile communication terminal and a communication object, searching multiple kinds of attribute information of the communication object in the mobile communication terminal, wherein each kind of attribute information carries a corresponding time tag respectively, and the communication object exchanges information with the mobile communication terminal by the communication;

determining at least one kind of attribute information among the multiple kinds of attribute information of the communication object is changed in a server based at least in part on information exchanged to the server at the occurrence of the communication between the mobile communication terminal and the communication object, wherein the determining at least one kind of attribute information among the multiple kinds of attribute information changed in a server further comprises:

sending an identity tag of the communication object and a time tag carried by the at least one kind of attribute information to the server, receiving an update instruction returned by the server according to the identity tag and the time tag, and determining that the update instruction is for updating the at least one kind of attribute information, wherein the update instruction includes attribute information to be updated;

acquiring changed attribute information from the server, and updating the changed attribute information of the communication object in the mobile communication terminal, wherein the acquiring changed attribute information from the server further comprises:

sending an update request carrying the identity tag of the communication object to the server according to the attribute information to be updated, and receiving the changed attribute information searched by the server according to the identity tag; and displaying an update of the multiple kinds of attribute information of the communication object on a communication interface of the mobile communication terminal according to a preset display format.

* * * * *